(12) United States Patent
Olmstead

(10) Patent No.: US 7,234,641 B2
(45) Date of Patent: Jun. 26, 2007

(54) ILLUMINATION PULSING METHOD FOR A DATA READER

(75) Inventor: Bryan L. Olmstead, Eugene, OR (US)

(73) Assignee: Datalogic Scanning, Inc., Eugene, OR (US)

( * ) Notice: Subject to any disclaimer, the term of this patent is extended or adjusted under 35 U.S.C. 154(b) by 92 days.

(21) Appl. No.: 11/045,817

(22) Filed: Jan. 28, 2005

(65) Prior Publication Data

US 2006/0113386 A1 Jun. 1, 2006

Related U.S. Application Data

(60) Provisional application No. 60/632,696, filed on Dec. 1, 2004.

(51) Int. Cl.
*G06K 7/10* (2006.01)
(52) U.S. Cl. ............. 235/454; 235/462.42; 235/462.24
(58) Field of Classification Search ................ 235/454, 235/462.01, 462.11, 462.24, 462.42, 470
See application file for complete search history.

(56) References Cited

U.S. PATENT DOCUMENTS

| | | | | |
|---|---|---|---|---|
| 4,997,271 A | * | 3/1991 | Shanks | ........................ 353/122 |
| 5,184,114 A | * | 2/1993 | Brown | ........................ 345/83 |
| 5,354,977 A | * | 10/1994 | Roustaei | ................ 235/462.11 |
| 5,981,944 A | * | 11/1999 | Ito | .............................. 250/235 |
| RE36,528 E | | 1/2000 | Roustaei | ................. 235/472.01 |
| 6,056,198 A | | 5/2000 | Rudeen et al. | ......... 235/462.24 |
| 6,357,659 B1 | | 3/2002 | Kelly et al. | ............ 235/462.01 |
| 6,575,368 B1 | | 6/2003 | Tamburrini et al. | ..... 235/462.25 |
| 2002/0125411 A1 | | 9/2002 | Christy | ....................... 250/225 |
| 2004/0215084 A1 | * | 10/2004 | Shimizu et al. | ............. 600/476 |
| 2005/0110751 A1 | * | 5/2005 | Wilson et al. | .............. 345/156 |
| 2005/0237476 A1 | * | 10/2005 | Braun | ........................ 349/199 |
| 2006/0249581 A1 | | 11/2006 | Smith | ........................ 235/454 |

OTHER PUBLICATIONS

U.S. Appl. No. 11/122,790 for Methods and Systems for Forming Images of Moving Optical Codes, inventor Larry J. Smith, filed May 3, 2005.

* cited by examiner

*Primary Examiner*—Steven S. Paik
(74) *Attorney, Agent, or Firm*—Stoel Rives LLP

(57) ABSTRACT

Row signals or other typically regular signals generated by an imager during each frame period of the imager are counted to determine when to emit pulses of illumination. Methods in accordance with the preferred embodiments may facilitate synchronization of at least some of the pulses with exposures of the imager, while pulsing visible illumination at a rate in excess of the flicker fusion frequency of human vision, to thereby avoid a flicker effect. Methods in accordance with disclosed embodiments are especially useful for a data reader including an imager when visible illumination is pulsed or when it is desired to pulse one or more illumination sources (whether or not visible) at a constant rate or a minimum rate, wherein the constant or minimum rate of pulses differs from a nominal frame rate of the imager.

33 Claims, 3 Drawing Sheets

ILLUMINATION PULSING METHOD FOR A DATA READER

RELATED APPLICATION

This application claims the benefit under 35 U.S.C. § 119(e) of U.S. Provisional Patent Application No. 60/632,696, filed Dec. 1, 2004, which is incorporated herein by reference.

TECHNICAL FIELD

The field of this disclosure relates to data readers such as optical code reading devices and image reader devices and, in particular, to methods and devices for pulsing one or more sources of illumination for data reading and imaging systems.

BACKGROUND

Optical data readers include devices for sensing illumination and typically illumination that is reflected by a surface being read. One type of data reader is an optical scanner for reading optical codes comprised of dark elements separated by white or light-colored spaces. A 1-D barcode (such as a UPC or EAN/JAN barcode) is an example of an optical code readable by such an optical scanner, although 2-D codes, such as PDF-417 and Maxicode, are also readable using similar methods and equipment. Other types of optical data readers are useful for reading other image data and other kinds of symbols.

Imaging devices such as charge-coupled devices (CCDs) and complementary metal oxide semiconductor (CMOS) imagers can be used to capture image data for use in data reading applications. In such devices, an image of the optical code or other scene is focused onto a detector array. With some such devices, it may be advantageous to provide a source of illumination that illuminates the optical code or other scene being imaged, to provide the required signal response in the imaging device. Such a source of illumination can reduce exposure time, thereby improving imager performance, especially in low ambient light conditions and when imaging moving items.

U.S. Provisional Patent Application No. 60/632,696 ("the '696 application") describes some potential advantages of utilizing pulsed illumination generated by an LED or other illumination source. The '696 application also describes the use of multiple different wavelengths of illumination in connection with a frame-shuttered imaging data reader, which may be useful for reading a variety of optical codes having different surface reflection characteristics. For example, infrared illumination in the range of 850 nm may result in improved imaging performance for many optical code surfaces, and infrared illumination has the added benefit of being invisible to the human eye. On the other hand, thermally printed barcodes have little or no contrast in the infrared spectrum, but good contrast in the visible spectrum at around 590 nm. In some instances, a single optical code may be more easily read by utilizing illumination of multiple different wavelengths. Thus, the present inventor has recognized a need for providing multiple wavelengths of illumination for a data reader and has proposed alternating between different illumination wavelengths for consecutive or sequential exposures of the imager to avoid interference and improve imager performance. Since infrared illumination is not visible, it can be pulsed a high power only when needed, during the exposure interval of selected frames of the imager. Visible illumination, however, must be pulsed at a lower luminous power and at a rate that is higher than the flicker fusion frequency of human vision (typically about 60 Hz) to avoid distracting users and bystanders. Unfortunately, imager frame rates may need to be slower (less) than the flicker fusion frequency, due to design constraints of the imager or other reasons; and, in such cases, the visible illumination cannot merely be triggered to coincide with the exposure intervals of the imager without resulting in a flicker effect. And even if the imager frame rate is greater than the flicker fusion frequency, if the visible illumination is not pulsed during every frame exposure (for example when multiple light sources of different wavelengths are used), then the resulting visible illumination pulse frequency may be lower than the flicker fusion frequency.

The present inventor has, therefore, recognized a need for improved methods of pulsing illumination for a data reader. The present inventor has also recognized a need for methods of pulsing illumination in conjunction with operating an imager; and, in particular, such methods that avoid the flicker effect while ensuring that illumination is pulsed during an imager's frame exposures or some subset thereof. The present inventor has also recognized a need for illumination pulsing methods that facilitate illumination with different wavelengths during sequential frame exposures of an imager.

SUMMARY

Systems and methods of pulsing one or more sources of illumination are disclosed for avoiding or minimizing the perception of flicker by a user or bystander. Methods according to various embodiments disclosed may facilitate synchronization of at least some of the pulses with exposure intervals of an imager. Such methods may be useful for pulsing illumination for a data reader at a rate equal to or greater than the flicker fusion frequency of human vision. In certain embodiments, methods of pulsing are utilized to expose alternating exposures of the imager to different wavelengths of illumination.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
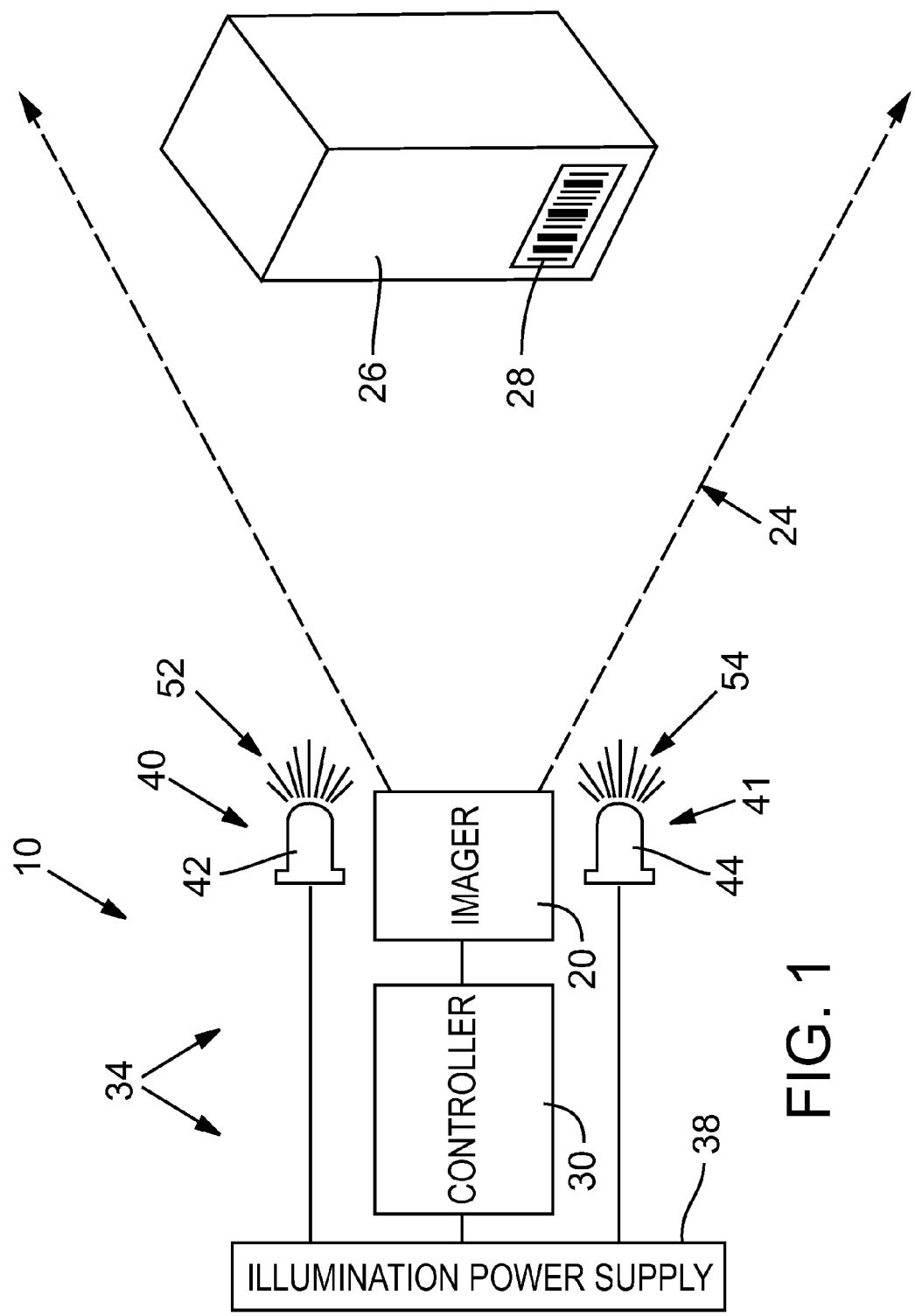
FIG. 1 is a schematic diagram showing a data reader, including an illumination system in accordance with one embodiment.

Throughout the specification, reference to "one embodiment," or "an embodiment," or "some embodiments" means that a particular described feature, structure, or characteristic is included in at least one embodiment. Thus appearances of the phrases "in one embodiment," "in an embodiment," or "in some embodiments" in various places throughout this specification are not necessarily all referring to the same embodiment.

Furthermore, the described features, structures, characteristics, and methods may be combined in any suitable manner in one or more embodiments. Various embodiments can be practiced without one or more of the specific details or with other methods, components, materials, etc. In other instances, well-known structures, materials, or operations are not shown or not described in detail to avoid obscuring aspects of the embodiments.

As described below with reference to the accompanying drawings, methods of pulsing illumination at a rate equal to or greater that the flicker fusion frequency are described for use with data reading and imaging systems. In accordance with preferred embodiments, row signals or other typically regular signals generated by an imager during each frame period of the imager are counted to determine when to emit pulses of illumination. Methods in accordance with the preferred embodiments may facilitate synchronization of at least some of the pulses with exposures of the imager, while pulsing visible illumination at a rate in excess of the flicker fusion frequency of human vision, to thereby avoid the perception of flicker by a user or bystander. In some embodiments, a signal output by the imager indicating the occurrence of an exposure of the imager is detected for determining when to emit illumination, such as a pulse of illumination from one or more light-emitting diodes (LED), for example. Such methods can facilitate pulsing of different wavelengths of illumination during consecutive or sequential frame exposures of the imager and, in some embodiments, may prevent simultaneous emission of the different wavelengths during exposure of a single frame. Methods in accordance with certain embodiments described herein may be especially useful for a data reader when visible illumination is pulsed or when it is desired to pulse one or more illumination sources (whether or not visible) at a constant rate or a minimum rate, wherein the constant or minimum rate of pulses differs from a nominal frame rate of an imager.

Unless the context indicates otherwise, the term "illumination" used herein is not limited to electromagnetic radiation in the visible spectrum, but also includes infrared radiation and other nonvisible radiation, particularly electromagnetic radiation in wavelengths that can be sensed by an imager.

In accordance with one aspect of the disclosed embodiments, a method of pulsing a source of illumination for a data reader at a rate equal to or greater than the minimum flicker fusion frequency of human vision comprises operating an imager at a nominal frame rate, the imager generating a predetermined number of regularly occurring row signals during each frame; incrementing a row counter in response to each row signal; and, in response to the row counter reaching a count corresponding to an illumination pulse frequency greater than or equal to the minimum flicker fusion frequency, pulsing a source of illumination, resetting the row counter, and repeating the steps of counting row signals and pulsing the source of illumination.

In accordance with another aspect of the disclosed embodiments, a method of preventing perceived flicker in an illumination system for an imager operating at a nominal frame rate comprises generating a series of signals at the imager that divide the frame period into a predetermined number of regular intervals; selecting an illumination pulse frequency that has a pulse period equal to an integer quantity (N) of the regular intervals and that is greater than or equal to the minimum flicker fusion frequency; counting the signals; and emitting a pulse of illumination when the number of signals generated equals N, or a multiple thereof.

In still another aspect of the disclosed embodiments, a method of pulsing illumination at a preselected illumination pulse frequency in conjunction with operation of a data reader including an imager having a field of view, comprises generating a plurality of row signals at the imager during each frame of the imager; incrementing a row counter in response to each row signal; in response to the row counter reaching a count corresponding to the illumination pulse frequency, emitting a pulse of illumination toward at least a portion of the field of view of the imager, resetting the row counter, and repeating the steps of counting row signals and emitting a pulse of illumination.

FIG. 1 is a schematic diagram of a data reader 10, which preferably includes hardware, software, or a combination thereof, for reading optical codes, such as barcodes or other symbols. With reference to FIG. 1, data reader 10 preferably includes an imager 20, such as a CMOS imager, having a field of view 24 within which a target item 26 bearing an optical code 28 may be presented for imaging. Field of view 24 may be defined or shaped by lenses or other optics (not shown) associated with imager 20. In other embodiments (not shown), imager 20 could be used for other imaging applications, such as fingerprint or retinal scanning, video recording, and other image capture functions.

Imager 20 preferably comprises an active-pixel digital imaging sensor with a global shutter (simultaneous total-pixel exposure system—also referred to as "frame shutter exposure") and good near infrared (NIR) sensitivity, such as a model MT9V022 sensor sold by Micron Technology, Inc. of Boise, Id., USA. In some embodiments, multiple CMOS imagers may be employed for reading items at different ranges, from different vantage points, or in multiple different fields of view, which may overlap. In other embodiments a different type of imager may be employed, such as a frame-shuttered interline transfer CCD, or a rolling-reset CMOS imager in conjunction with a mechanical or electro-mechanical shutter, for example.

A processor or controller 30 is coupled to imager 20 for receiving image data and other signals generated by imager 20, and for controlling an illumination system 34. Although typically separate from imager 20, it is contemplated that controller 30, and some or all of the functions and method steps described herein as being performed by controller 30, could be integrated with imager 20. Image data generated by imager 20 may be received and processed by controller 30 or transmitted to another component (not shown) of data reader 10 for processing. Controller 30 may comprise any suitable digital processor, such as a low-power DSP-core or ARM-core processor. Controller 30 may also comprise multiple digital or analog processors, or combinations thereof.

The illumination system 34 is directly or indirectly coupled to controller 30 and preferably includes an illumination power supply 38 driving one or more illumination sources 40, 41 for directing one or more wavelengths of illumination toward field of view 24. Each of the illumination sources 40, 41 preferably includes one or more light emitting-diodes (LEDs) or collections of LEDs. In the embodiment illustrated, the illumination sources 40, 41 include a first LED 42 and a second LED 44, which are driven by a single illumination power supply 38. In other embodiments (not shown), multiple power supplies may be included for independently driving respective illumination sources or groups thereof. First and second LEDs 42, 44 may be of the same wavelength or different wavelengths. In a preferred embodiment, first LED 42 is energized to emit pulses of noncoherent visible illumination 52, while second LED 44 is energized to emit pulses of noncoherent infrared illumination 54 in the near infrared spectrum. First LED 42, in one embodiment, emits red light at a wavelength of about 640 nm and, in another embodiment, emits yellow light at a wavelength of about 590 nm. Second LED 44 preferably emits radiation in the near infrared spectrum—in one embodiment at a wavelength of about 850 nm, and in another at a wavelength of about 700 nm. However, in other embodiments, one or more of the illumination sources 40 may emit illumination of one or more other spectral wavelengths or ranges thereof. One or more of the illumination sources 40 may also emit constant (non-pulsed) illumination or coherent illumination, although at least one such illumination source 40 should be pulsed or shuttered. Illumination sources 40 may also comprise light emitting devices other than LEDs, particularly such devices capable of meeting the pulse response, intensity, and power consumption criteria desired for a particular imaging task.

First and second LEDs 42, 44 are preferably pulsed in coordination with a shutter of imager 20 to concentrate at least some of their emitted illumination during the critical exposure interval of the imager. Pulsing of LEDs 42, 44 may help in reading optical codes 28 borne by objects 26 moving at relatively high speeds in front of data reader 10. Among other potential benefits, pulsing of illumination sources may result in lower power consumption than driving them constantly. Pulsing may also improve image clarity in low light conditions or for moving scenes, and may further extend the life of LEDs and other types of illumination sources 40. LEDs 42, 44 at the current state of the art are tolerant of considerable pulsed current overdrive at short duty cycles, enabling intense illumination during the exposure interval of the imager 20, while providing a low average brightness due to the short duty cycle.

First and second LEDs 42, 44 are preferably pulsed briefly (short pulse width) at high input power. For example, infrared LEDs may be pulsed for about 260 µs (microseconds) or less at a current of approximately 500 mA; and red or yellow LEDs may be pulsed for about 650 µs at a current of approximately 140 mA. The pulse width of infrared LEDs may be adjusted to compensate for scene brightness or reflectance changes. However, because adjustments to the pulse width of red or yellow LEDs would be noticeable, it is preferable to adjust the exposure time of imager 20 to compensate for changes in brightness or reflectance in the visible spectrum. Changing the exposure time may affect the frame rate of imager 20, but the number of blanking rows of the imager may be adjusted to compensate therefor. LEDs 42 and 44 are preferably pulsed at suitable rates and times to avoid simultaneous emission of visible illumination 52 and infrared illumination 54 during exposure of a single frame of imager 20. Methods for avoiding such simultaneous emission are described below with reference to FIGS. 3–7.

Figures 2, 3:
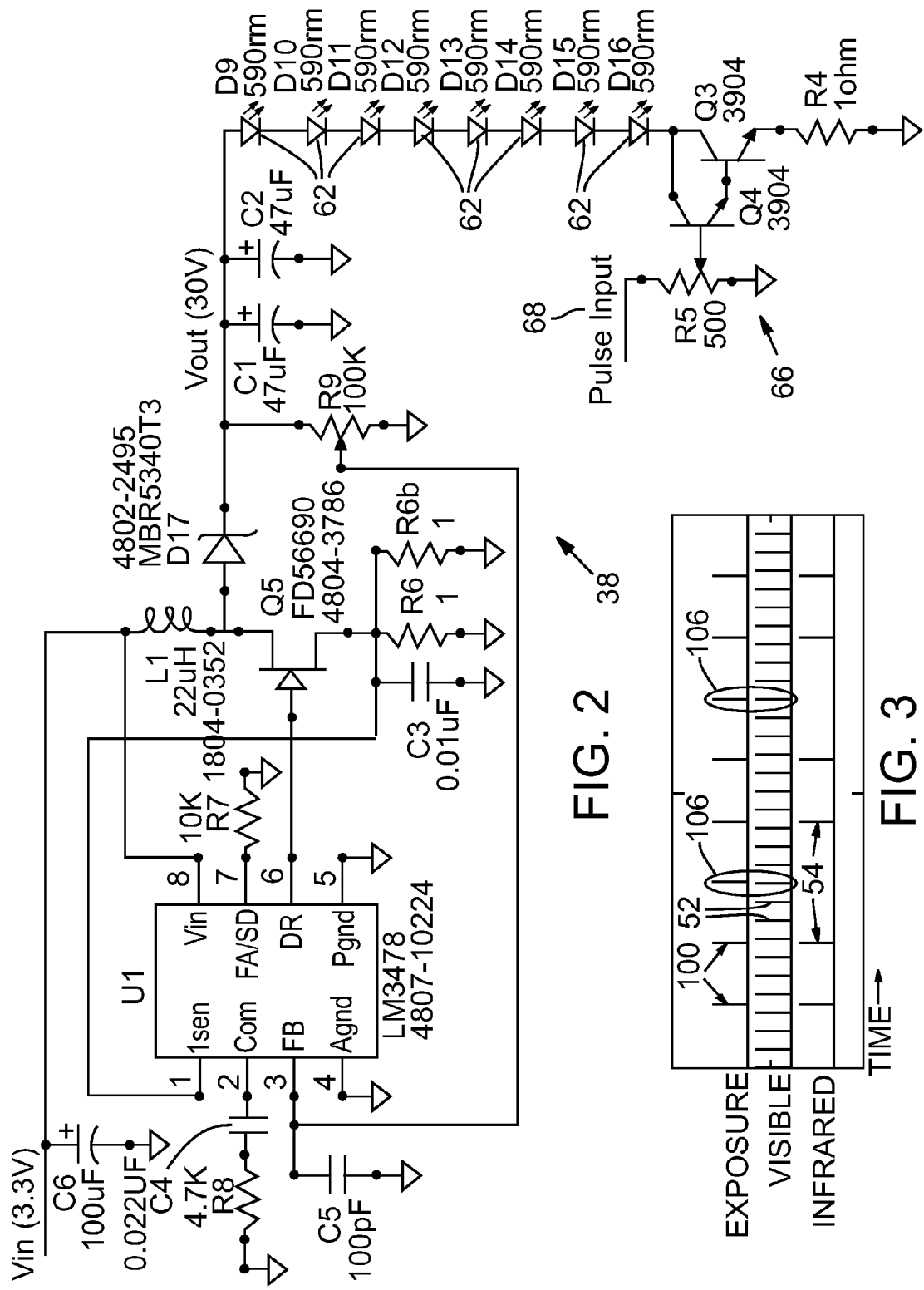
FIG. 2 is a schematic diagram of a power supply for a set of LEDs, in accordance with a one preferred illumination system.
FIG. 3 is a timing diagram illustrating the relative timing of imager frame exposure and illumination pulses, in accordance with an embodiment of a method of pulsing illumination.

Without limiting the scope of the disclosure, FIG. 2 illustrates an exemplary illumination power supply 38. With reference to FIG. 2, power supply 38 drives a set of eight yellow LEDs 62 in series to ensure uniform power input and illumination output across all of the yellow LEDs 62. Power supply 38 provides a high DC voltage in order to source current for yellow LEDs 62. A switching circuit 66 of power supply 38 controls constant current pulsing of LEDs 62 in response to a digital pulse input signal 68 received from controller 30. Skilled persons will appreciate that power supply 38 and switching circuit 66 are designed to pulse yellow LEDs 62 at high current for a short duty cycle (in this example at about 140 mA for approximately 650 µs).

In a preferred embodiment, alternating frame exposures of imager 20 are illuminated with respective pulses of visible illumination 52 and infrared illumination 54. Among other advantages, alternating between two or more different wavelengths of illumination may improve the imager's depth of field and the readability of poor quality and high density optical codes. To avoid an annoying flicker effect, visible illumination 52 is desirably pulsed at a frequency sufficient to take advantage of the persistence of vision. By way of background, the persistence of vision is a phenomenon of human vision wherein light continues to be perceived for a fraction of a second after it ceases to be received by the eye. For most people, light pulsed at a frequency in excess of 50 Hz will exceed their so-called "flicker fusion frequency" and no flicker effect will be perceived. This effect is employed in motion pictures and television, wherein the illusion of a moving image is perceived from a sequence of static images or pixilated light sources. The flicker fusion frequency varies from person to person, and may be affected by the pulse width, wavelength, and intensity of the illumination. It may also be affected by other variables in the image or illumination being received. The flicker fusion frequency of human vision typically ranges from as low as about 15 Hz to as high as about 65 Hz. Thus, references herein to the "minimum flicker fusion frequency" shall typically mean a frequency of about 15 Hz, unless the context indicates otherwise.

FIG. 3 is a timing diagram illustrating frame exposure intervals 100 of imager 20 (FIG. 1) operating at a nominal frame rate FR of 20 Hz, pulses of visible illumination 52 emitted by first LED 42, and pulses of infrared illumination 54 emitted by second LED 44. The frame rate of imager 20 is determined by factors such as the specifications of the imager, the speed of processing at controller 30 or elsewhere, the velocity of object 26, and other factors potentially unrelated to illumination. With reference to FIG. 3, the pulses of visible illumination 52 are emitted at an illumination pulse frequency of approximately 66.7 Hz, exceeding the flicker fusion frequency. In this example, the illumination pulse frequency is selected so that ten visible illumination pulses 52 are emitted during every three exposure intervals 100 of imager 20, for an average of 3.33 visible illumination pulses 52 per frame of imager 20, and so that one of the visible illumination pulses 52 coincides with every third exposure interval 106 of imager 20. However, at different nominal frame rates FR, it may be possible for fewer visible pulses to be emitted during each frame or, alternatively, it may be necessary for a greater number of visible pulses 52 to be emitted during each frame. With reference to FIG. 3, pulses of infrared illumination 54 are emitted to coincide with the exposure interval 100 of each frame, except for every third exposure interval 106. In other embodiments, visible illumination pulses 52 may coincide with exposure intervals more or less frequently than every third exposure interval, which may also affect the timing of infrared illumination pulses 54. For example, with alternate timing, visible pulses 52 could correspond with the exposure interval of every other frame of imager 20, with infrared illumination pulses 54 being emitted during exposure of alternate frames. The pulse sequence of infrared illumination pulses 54 should be preselected and programmed into controller 30 so that infrared illumination pulses 54 are not emitted during frame exposures that are illuminated by visible illumination pulses 52.

Figure 4:
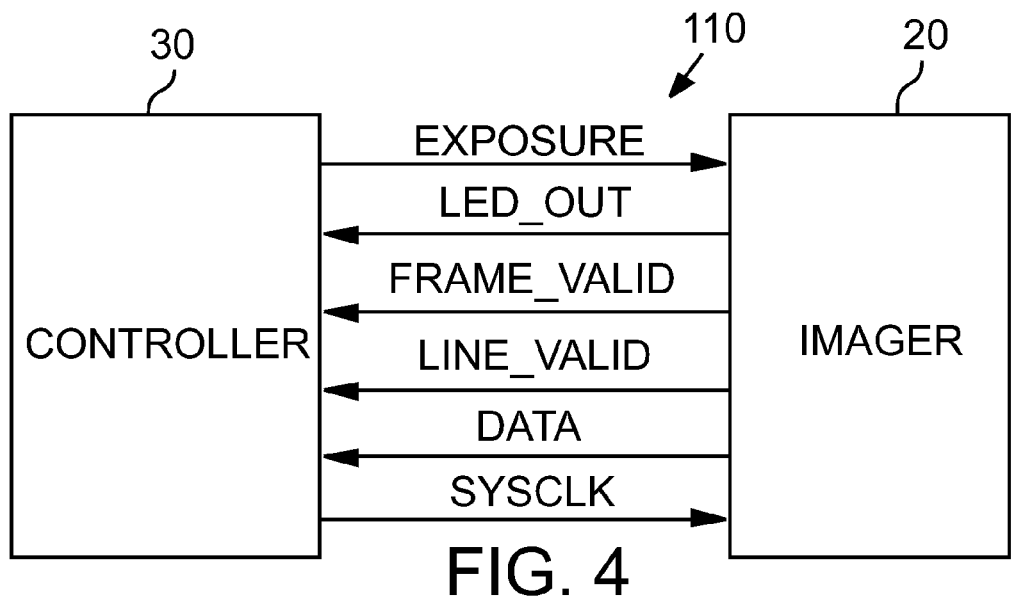
FIG. 4 is a schematic diagram showing interface signals transmitted between an imager and a controller of the data reader of FIG. 1.

The actual frame period of the imager 20, i.e., the inverse of the nominal frame rate (1/FR), can vary slightly due to the imager's automatic exposure control, variations in necessary integration time at the imager 20, and other factors. It is, therefore, desirable to somehow tie the illumination pulse timing to the timing of imager 20, to ensure that a visible illumination pulse 52 is synchronized with every third frame exposure and, preferably, to eliminate the need to externally adjust the timing of the illumination pulses. As depicted in FIG. 4, imager 20 generates and outputs interface signals 110, which are useful for purposes of timing or triggering the illumination pulses. In some embodiments, an interface signal input to imager 20 by controller 30 may also be used for timing of illumination pulses.

Figure 5:
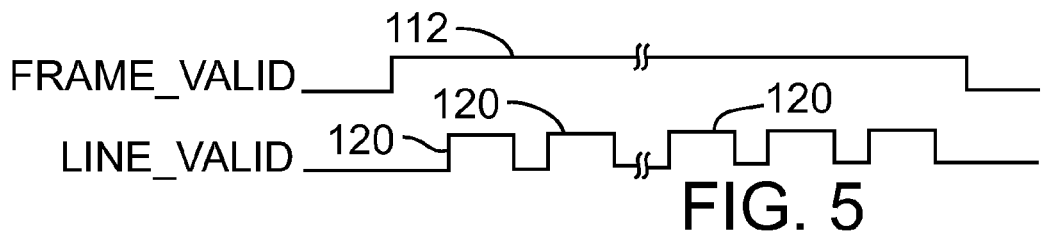
FIG. 5 is a timing diagram of the frame and row (line) interface signals generated by the imager of FIGS. 1 and 4.

With reference to FIGS. 4 and 5, interface signals 110 include a FRAME_VALID signal 112 output by imager 20 and indicating the start of a frame readout sequence of imager 20. The FRAME_VALID signal 112 may be used as a vertical synchronization signal for use in capturing of an image within field of view 24 or for subsequent display of the image. During readout of a single frame, imager 20 outputs multiple row signals 120 (identified in the figures as "LINE_VALID"), one row signal 120 being output each time the imager 20 commences to readout a row (line) of pixel data. The LINE_VALID signal 120 may be used as a horizontal synchronization signal for use in capturing of an image within field of view 24 or for subsequent display of the image. Pixel data is output by imager 20 via the DATA signal, which may be output in serial form or more typically as a parallel digital bus, in a manner well known in the art. The remaining interface signals 110 include SYSCLK, a master clock input to the imager for use in clocking out each pixel from imager 20; LED_OUT (discussed below with reference to FIGS. 6 and 7), which indicates the extent of an exposure interval; and EXPOSURE, an input signal used to trigger exposure when operating imager 20 in an optional slave mode (also discussed below with reference to FIGS. 6 and 7).

The inventor has discovered that a convenient method for pulsing is to count the row signals 120 output by imager 20 until the count matches a terminal count corresponding to the desired illumination pulse frequency, and thereafter emitting a pulse of the illumination. Use of a counter coupled to LINE_VALID for receiving row signals 120 may simplify the design of controller 30, as compared to utilizing SYSCLK or some other reference signal for timing of illumination pulses 52, 54. Each time a counter of controller 30 reaches the terminal count, it can be reset and the process repeated. When operating the imager 20 in a master mode, wherein exposure timing is generated internally of imager 20 based on a preset or selected nominal frame rate FR, the illumination timing shown in FIG. 3 can be achieved by counting row signals 120 of imager 20, as follows. First, the number of row signals 120 output during a single frame is determined. The default (minimum) number of row signals 120 output during a frame is equal to the number of rows (lines) in the imager's pixel array, plus the default number of blanking rows of the imager 20 (which determines the default vertical synchronization interval). The exposure interval of imager 20 may occur during the readout of pixel data or during the blanking period, depending on the hardware design and settings of imager 20. The number of row signals 120 output during each frame may be adjusted by adjusting a vertical blanking setting of the imager 20 (i.e. by changing the number of blanking rows).

By adjusting the number of blanking rows, the ratio between the desired number of rows (active and blanking) contained in the desired number of frames between visible exposures to the number of rows between consecutive pulses of visible illumination can be made to be an integer. With reference to the example of FIG. 3, suppose the minimum number of rows NMR of the imager is 484 and its nominal frame rate FR is 20 Hz. To achieve an illumination pulse frequency in excess of a flicker fusion frequency FF of 60 Hz, the visible illumination 52 must be pulsed at least three (3) times per frame (60 Hz/20 Hz=3=R). At this rate, the lowest integer multiple of illumination pulses RR that can be emitted so that only every third frame (FY=3) is exposed with visible illumination is calculated as follows:

$$RR=\text{floor}[(R \times FY)+1]=\text{floor}[(3 \times 3)+1]=10 \qquad (1)$$

where floor[x] represents the nearest integer less than or equal to x. The required number of rows NL is then:

$$NL=\text{floor}[(NMR \div RR)+1] \times RR=\text{floor}[(484 \div 10)+1] \times 10=490 \qquad (2)$$

Another way to state this is:

$$NL=\text{ceiling}[NMR \div RR] \times RR \qquad (3)$$

where ceiling[x] represents the nearest integer greater than or equal to x. From the calculation of the number of rows per frame, we can then determine the number of rows to skip between pulses of illumination NY, as follows:

$$NY=NL \times FY \div RR=147 \qquad (4)$$

As can be seen from these calculations, the ratio of RR/FY has no common factors (i.e. RR and FY do not have a common factor). Thus, the ratio RR/FY represents the frame rate with the lowest number of rows to achieve the desired goal, namely, that the ratio between the number of rows contained in the desired number of frames of between visible exposures to the number of rows between turning on the visible illumination is an integer.

If it is desired to use more than one wavelength of visible illumination, the same equations above can be extended to determine row signal counts to use for ensuring a pulse rate of the second wavelength that is greater than the flicker fusion frequency and that exposes the imager at the appropriate times. And if the desired illumination pulse rate of the second wavelength of visible illumination is the same as the pulse rate of the first wavelength of visible illumination, then it should merely be necessary to phase shift the pulses so that they are aligned with alternating exposures of the imager.

Figure 6:
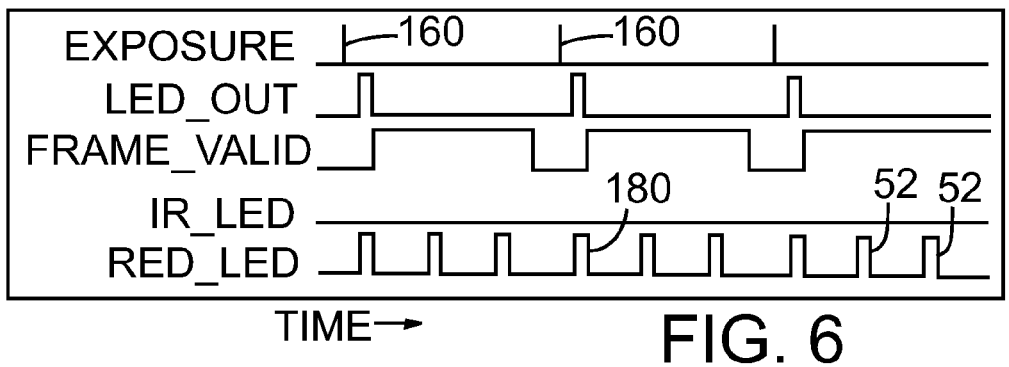
FIG. 6 is a timing diagram illustrating the relative timing of a frame exposure trigger signal, imager interface signals, and (visible red) illumination pulses, in accordance with an embodiment of a method of pulsing illumination, wherein the imager is operating in a slave mode and a single wavelength of visible illumination is pulsed.
Figure 7:
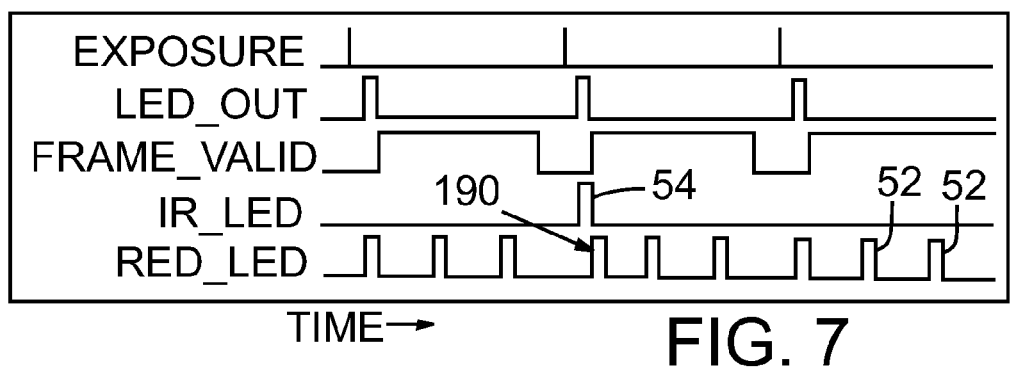
FIG. 7 is a timing diagram illustrating the embodiment of FIG. 6, but wherein a first (visible red) and second (infrared) wavelengths of illumination are pulsed during alternating frame exposures of the imager.

FIGS. 6 and 7 illustrate timing of interface signals 110 and illumination pulses 52 and 54, when imager 20 is operated in a slave mode. The slave mode may be desirable, for example, to accommodate occasional delays in image data processing occurring at controller 30 or elsewhere in data reader 10. With reference to FIG. 6, in the slave mode, each frame sequence of imager 20 is started by an exposure signal 160 that is output by controller 30 (FIG. 4) and received by imager 20 as an input via its EXPOSURE interface. Each exposure signal 160 acts as a frame trigger that, when received by imager 20, causes imager 20 to respond (typically after a default delay time) by bringing the LED_OUT signal high, indicating the beginning of the exposure interval. The leading edge of LED_OUT is used by controller 30 to trigger a pulse of illumination during the exposure interval. Whether the controller 30 triggers a pulse of visible illumination 52 or a pulse of infrared illumination 54 (or some other wavelength, if used) depends on the sequence of illumination that has been programmed into controller 30. Controller 30 may, alternatively, generate pulses 52 and 54 without using an LED_OUT signal. For example, in some embodiments, controller 30 may time row pulses 120 (e.g., LINE_VALID) from the start of each exposure signal 160 to determine when illumination can be pulsed concurrently with an exposure interval.

The period between exposure signals 160 (and, thus, the exposure intervals of imager 20) is intended to be substantially constant but can vary slightly due to processing of the image by controller 30 or elsewhere in data reader 10 in a manner that does not adversely effect the maintenance of the characteristics of visible illumination 52 to avoid the flicker effect. The inventor has recognized that the human eye is quite sensitive to variations in the LED pulse rate, as this frequency modulation causes sidebands that could cause illumination pulse frequencies below the flicker fusion frequency; and when operating in the slave mode, exposure signals 160 should therefore be emitted at a frequency that is sufficiently constant to largely avoid these effects.

In the example of FIG. 6, only a single wavelength of visible (red) illumination 52 is being pulsed, at a rate of exactly three times per frame, as indicated in FIG. 6 by the RED_LED signal. After each exposure interval, demarcated by LED_OUT, imager will bring the FRAME_VALID signal high and begin outputting row signals 120 (e.g., LINE_VALID, FIG. 4), which controller 30 may count for the successive pulses of illumination, in the same manner as discussed above with reference to FIGS. 3–5 when operating imager in master mode. At the completion of the frame, following the vertical synchronization interval, controller 30 must again trigger the imager's frame exposure and readout sequence by outputting another exposure signal 160 to the EXPOSURE interface, followed by sensing for the LED_OUT signal (or LINE_VALID) to determine when to emit a further pulse 180 of visible illumination. On the occasion that the controller 30 is not immediately ready following a frame to begin exposing the next frame, the amount of delay incurred should be small and any consequent slowing of the illumination pulse rate should be undetectable, or if any flicker is detectable it should be subtle.

With reference to FIG. 7, in frames exposed by visible illumination 52, the timing similar to that of FIG. 6. Alternating frames, however, are exposed with infrared illumination 54 in the embodiment of FIG. 7, according to a defined duty cycle programmed into controller 30. To avoid pulsing both the visible and infrared illumination during the same exposure interval, whenever the infrared illumination 54 is pulsed, controller waits for the falling edge of LED_OUT (indicating the end of the exposure interval) before triggering the next pulse 190 of visible illumination. The duration of the exposure interval is very small compared to the frame period, so the delay in emitting pulse 190 will cause negligible flicker effects.

In some embodiments, the number of row signals can also be counted to regulate the duration of the illumination pulses. For example, if it is known that at the nominal frame rate and frame size that the row time is approximately 20% of a desired pulse duration, then five row signals 120 (e.g., LINE_VALID) can be counted to determine the duration of the desired illumination pulse. This technique can further simplify the design of controller 30, as it allows internal counters of controller 30 to use the same row signals 120 (e.g., LINE_VALID pulses) in determining both the timing and duration (pulse width) of illumination pulses 52 and 54.

It will be obvious to those having skill in the art that many changes may be made to the details of the above-described embodiments without departing from the underlying principles of the invention. The scope of the present invention should, therefore, be determined only by the following claims.

The invention claimed is:

1. A method of pulsing a source of illumination for a data reader at a rate equal to or greater than the minimum flicker fusion frequency of human vision, comprising:
    (a) operating an imager at a nominal frame rate, the imager generating a predetermined number of regularly occurring row signals during each frame;
    (b) in response to each row signal, incrementing a row counter;
    (c) in response to the row counter reaching a count corresponding to an illumination pulse frequency greater than or equal to the minimum flicker fusion frequency, pulsing a source of illumination and resetting the row counter;
    (d) repeating steps (b) and (c);
    (e) detecting a signal output by the imager indicating the occurrence of an exposure of the imager; and
    (f) in response to detecting the signal, pulsing the source of illumination.

2. The method of claim 1, wherein:
    the signal rises upon commencement of the exposure and falls after the exposure is completed; and
    the source of illumination is pulsed in response to the falling of the signal.

3. The method of claim 1, wherein the source of illumination includes a light emitting diode (LED).

4. A method of pulsing a source of illumination for a data reader at a rate equal to or greater than the minimum flicker fusion frequency of human vision, comprising:
    (a) operating an imager at a nominal frame rate, the imager generating a predetermined number of regularly occurring row signals during each frame;
    (b) in response to each row signal, incrementing a row counter;
    (c) in response to the row counter reaching a count corresponding to an illumination pulse frequency greater than or equal to the minimum flicker fusion frequency, pulsing a source of illumination and resetting the row counter; and
    (d) repeating steps (b) and (c);
    wherein the source of illumination includes an illumination source of a first wavelength and, further comprising, an illumination source of a second wavelength, the first and second wavelengths of illumination being pulsed during consecutive frame exposures of the imager.

5. The method of claim 4, further comprising pulsing the illumination source of the first wavelength immediately following a frame exposure during which the second wavelength of illumination has been pulsed.

6. A method of pulsing a source of illumination for a data reader at a rate equal to or greater than the minimum flicker fusion frequency of human vision, comprising:
(a) operating an imager at a nominal frame rate, the imager generating a predetermined number of regularly occurring row signals during each frame;
(b) in response to each row signal, incrementing a row counter;
(c) in response to the row counter reaching a count corresponding to an illumination pulse frequency greater than or equal to the minimum flicker fusion frequency, pulsing a source of illumination and resetting the row counter; and
(d) repeating steps (b) and (c);
wherein:
each frame has a frame period;
the pulsing of the illumination has a pulse period; and
the duration of a first integer multiple of the pulse period equals the duration of a second integer multiple of the frame period, and the first and second integer multiples do not have a common factor.

7. A method of pulsing a source of illumination for a data reader at a rate equal to or greater than the minimum flicker fusion frequency of human vision, comprising:
(a) operating an imager at a nominal frame rate, the imager generating a predetermined number of regularly occurring row signals during each frame;
(b) in response to each row signal, incrementing a row counter;
(c) in response to the row counter reaching a count corresponding to an illumination pulse frequency greater than or equal to the minimum flicker fusion frequency, pulsing a source of illumination and resetting the row counter;
(d) repeating steps (b) and (c); and
(e) adjusting a number of blanking rows of the imager.

8. A method of preventing perceived flicker in an illumination system for an imager operating at a nominal frame rate, comprising:
during a frame period of the imager, generating at the imager a series of signals that divide the frame period into a predetermined number of regular intervals;
selecting an illumination pulse frequency that has a pulse period equal to an integer quantity (N) of the regular intervals and that is greater than or equal to the minimum flicker fusion frequency of human vision;
emitting a first pulse of illumination;
after emitting the first pulse of illumination, counting the signals until the number of signals generated equals N, and thereafter emitting a second pulse of illumination;
detecting a second signal output by the imager indicating the occurrence of an exposure of the imager; and
in response to detecting the second signal, emitting a third pulse of illumination.

9. The method of claim 8, further comprising counting the signals until another N of the signals have been generated, and thereafter emitting a fourth pulse of illumination.

10. The method of claim 8, wherein:
the second signal rises upon commencement of the exposure and falls after the exposure is completed; and
the third pulse of illumination is emitted in response to the falling of the second signal.

11. The method of claim 8, wherein the first, second, and third pulses of illumination are of a first wavelength and, further comprising, pulsing illumination of a second wavelength, the first and second wavelengths of illumination being pulsed during consecutive frame exposures of the imager.

12. The method of claim 11, wherein the third pulse immediately follows a frame exposure during which the second wavelength of illumination has been pulsed.

13. The method of claim 8, wherein emitting the pulses of illumination includes energizing a light emitting diode (LED).

14. A method of preventing perceived flicker in an illumination system for an imager operating at a nominal frame rate, comprising:
during a frame period of the imager, generating at the imager a series of signals that divide the frame period into a predetermined number of regular intervals;
selecting an illumination pulse frequency that has a pulse period equal to an integer quantity (N) of the regular intervals and that is greater than or equal to the minimum flicker fusion frequency of human vision;
emitting a first pulse illumination;
after emitting the first pulse of illumination, counting the signals until the number of signals generated equals N, and thereafter emitting a second pulse of illumination; and
counting the signals until another N of the signals have been generated, and thereafter emitting a third pulse of illumination.

15. A method of preventing perceived flicker in an illumination system for an imager operating at a nominal frame rate, comprising:
during a frame period of the imager, generating at the imager a series of signals that divide the frame period into a predetermined number of regular intervals;
selecting an illumination pulse frequency that has a pulse period equal to an integer quantity (N) of the regular intervals and that is greater than or equal to the minimum flicker fusion frequency of human vision;
emitting a first pulse of illumination; and
after emitting the first pulse of illumination, counting the signals until the number of signals generated equals N, and thereafter emitting a second pulse of illumination;
wherein the duration of a first integer multiple of the pulse period equals the duration of a second integer multiple of the frame period, and the first and second integer multiples do not have a common factor.

16. A method of preventing perceived flicker in an illumination system for an imager operating at a nominal frame rate, comprising:
during a frame period of the imager, generating at the imager a series of signals that divide the frame period into a predetermined number of regular intervals;
selecting an illumination pulse frequency that has a pulse period equal to an integer quantity (N) of the regular intervals and that is greater than or equal to the minimum flicker fusion frequency of human vision;
emitting a first pulse of illumination;
after emitting the first pulse of illumination, counting the signals until the number of signals generated equals N, and thereafter emitting a second pulse of illumination; and
adjusting a number of blanking rows of the imager.

17. A method of pulsing illumination at a preselected illumination pulse frequency in conjunction with operation of a data reader including an imager having a field of view, comprising:
(a) at the imager, generating a plurality of row signals during each frame of the imager, each frame having a frame period, the row signals dividing the frame period into a predetermined number of regular intervals;

(b) in response to each row signal, incrementing a row counter;

(c) in response to the row counter reaching a count corresponding to the illumination pulse frequency, emitting a pulse of illumination toward at least a portion of the field of view of the imager and resetting the row counter; and (d) repeating steps (b) and (c).

18. The method of claim 17, further comprising selecting an illumination pulse frequency that has a pulse period equal to an integer multiple of the regular intervals.

19. The method of claim 17, wherein emitting the pulses of illumination includes energizing a light emitting diode (LED).

20. The method of claim 17, wherein:
the illumination pulse frequency corresponds to a pulse period; and
the duration of a first integer multiple of the pulse period equals the duration of a second integer multiple of the frame period, and the first and second integer multiples do not have a common factor.

21. The method of claim 17, further comprising:
detecting a signal output by the imager indicating the occurrence of an exposure of the imager; and
in response to detecting the signal, emitting a second pulse of illumination.

22. The method of claim 17, wherein the illumination pulse frequency is greater than or equal to the minimum flicker fusion frequency of human vision.

23. A method of pulsing illumination at a preselected illumination pulse frequency in conjunction with operation of a data reader including an imager having a field of view, comprising:

(a) at the imager, generating a plurality of row signals during each frame of the imager;

(b) in response to each row signal, incrementing a row counter;

(c) in response to the row counter reaching a count corresponding to the illumination pulse frequency, emitting a pulse of illumination toward at least a portion of the field of view of the imager and resetting the row counter; and (d) repeating steps (b) and (c);

wherein the illumination pulse frequency is greater than or equal to the minimum flicker fusion frequency of human vision.

24. A method of pulsing illumination at a preselected illumination pulse frequency in conjunction with operation of a data reader including an imager having a field of view, comprising:

(a) at the imager, generating a plurality of row signals during each frame of the imager;

(b) in response to each row signal, incrementing a row counter;

(c) in response to the row counter reaching a count corresponding to the illumination pulse frequency, emitting a pulse of illumination toward at least a portion of the field of view of the imager and resetting the row counter;

(d) repeating steps (b) and (c);

(e) detecting a signal output by the imager indicating the occurrence of an exposure of the imager; and (f) in response to detecting the signal, emitting a second pulse of illumination.

25. The method of claim 24, wherein:
the signal indicating the occurrence of an exposure rises upon commencement of the exposure and falls after the exposure is completed; and
the second pulse of illumination is emitted in response to the falling of the signal.

26. The method of claim 24, wherein respective first and second wavelengths of illumination are pulsed during consecutive frame exposures of the imager.

27. The method of claim 26, further comprising pulsing the first wavelength of illumination immediately following a frame exposure during which the second wavelength of illumination has been pulsed.

28. The method of claim 27, in which the first wavelength of illumination is in the visible spectrum and the second wavelength of illumination is in the near infrared spectrum.

29. A method of pulsing illumination at a preselected illumination pulse frequency in conjunction with operation of a data reader including an imager having a field of view, comprising:

(a) at the imager, generating a plurality of row signals during each frame of the imager;

(b) in response to each row signal, incrementing a row counter;

(c) in response to the row counter reaching a count corresponding to the illumination pulse frequency, emitting a pulse of illumination toward at least a portion of the field of view of the imager and resetting the row counter; and (d) repeating steps (b) and (c);

wherein the pulses of illumination emitted in response to the row counter reaching the count are of a first wavelength and, further comprising, emitting pulses of a second wavelength of illumination, the first and second wavelengths of illumination being pulsed during consecutive frame exposures of the imager.

30. The method of claim 29, wherein the second pulse of illumination of the first wavelength immediately follows a frame exposure during which one of the pulses of the second wavelength of illumination is emitted.

31. A method of pulsing illumination at a preselected illumination pulse frequency in conjunction with operation of a data reader including an imager having a field of view, comprising:

(a) at the imager, generating a plurality of row signals during each frame of the imager;

(b) in response to each row signal, incrementing a row counter;

(c) in response to the row counter reaching a count corresponding to the illumination pulse frequency, emitting a pulse of illumination toward at least a portion of the field of view of the imager and resetting the row counter; and (d) repeating steps (b) and (c);

wherein:
each frame has a frame period;
the illumination pulse frequency corresponds to a pulse period; and
the duration of a first integer multiple of the pulse period equals the duration of a second integer multiple of the frame period, and the first and second integer multiples do not have a common factor.

32. The method of claim 31, wherein the illumination pulse frequency is greater than or equal to the minimum flicker fusion frequency of human vision.

33. A method of pulsing illumination at a preselected illumination pulse frequency in conjunction with operation of a data reader including an imager having a field of view, comprising:
(a) at the imager, generating a plurality of row signals during each frame of the imager;
(b) in response to each row signal, incrementing a row counter;
(c) in response to the row counter reaching a count corresponding to the illumination pulse frequency, emitting a pulse of illumination toward at least a portion of the field of view of the imager and resetting the row counter;
(d) repeating steps (b) and (c); and
(e) adjusting a number of blanking rows of the imager.

* * * * *

UNITED STATES PATENT AND TRADEMARK OFFICE
CERTIFICATE OF CORRECTION

PATENT NO. : 7,234,641 B2 Page 1 of 1
APPLICATION NO. : 11/045817
DATED : June 26, 2007
INVENTOR(S) : Brian L. Olmstead It is certified that error appears in the above-identified patent and that said Letters Patent is hereby corrected as shown below:

Column 10
Line 49, change "norninal" to --nominal--.

Column 12
Line 20, after "pulse" add --of--.

Signed and Sealed this

Seventh Day of April, 2009

JOHN DOLL
*Acting Director of the United States Patent and Trademark Office*